United States Patent [19]

Kurokawa et al.

[11] Patent Number: 5,689,450

[45] Date of Patent: Nov. 18, 1997

[54] PARALLEL PROCESSOR

[75] Inventors: Masuyoshi Kurokawa; Takao Yamazaki, both of Kanagawa, Japan

[73] Assignee: Sony Corporation, Tokyo, Japan

[21] Appl. No.: 520,175

[22] Filed: Aug. 28, 1995

[30] Foreign Application Priority Data

Aug. 30, 1994 [JP] Japan .................................. 6-205663
Mar. 31, 1995 [JP] Japan .................................. 7-075811

[51] Int. Cl.⁶ .................................................. G06F 7/38
[52] U.S. Cl. ........................................................ 364/736
[58] Field of Search ................................. 364/736, 730, 364/748, 760; 395/800

[56] References Cited

U.S. PATENT DOCUMENTS

| | | | |
|---|---|---|---|
| 4,694,416 | 9/1987 | Wheeler et al. | 364/736 |
| 4,712,175 | 12/1987 | Torii et al. | 364/736 |
| 4,720,780 | 1/1988 | Dolecek | 364/736 |
| 4,872,133 | 10/1989 | Leeland | 364/736 |
| 5,235,536 | 8/1993 | Matsubishi et al. | 364/736 |
| 5,268,856 | 12/1993 | Wilson | 364/736 |

FOREIGN PATENT DOCUMENTS

| | | |
|---|---|---|
| 0 317 413 | 5/1989 | European Pat. Off. |
| 0 422 965 | 4/1991 | European Pat. Off. |
| 0 463 721 | 1/1992 | European Pat. Off. |

OTHER PUBLICATIONS

IEEE 1990 SVP: Serial Video Processor by Childers et al.; pp. 17.3.1–17.3.4.

TMC 57100 User's Manual, Texas Instruments, 1990, pp. 4-4 to 4-13.

Proceedings of the IEEE 1990 Custom Integrated Circuits Conference (Cat. No. 90CH2860-5), Boston, MA, USA, 13–16 May 1990, 1990, New York, NY, USA, IEEE, USA, pp. 17.3/1–4, Childers, J. et al. 'SVP: serial video processor'.

IEEE Journal of Solid-State Circuits, vol. 23, No. 5, 1 Oct. 1988, pp. 1203–1211, XP 000112224 Toru Baji et al. 'A 20-NS CMOS Micro-DSP Core for Video-Signal Processing'.

Patent Abstracts of Japan, vol. 018 No. 365 (P-1767), 8 Jul. 1994 & JP-A-06 096036 (Sony Corp.), 8 Apr. 1994.

*Primary Examiner*—Tan V. Mai
*Attorney, Agent, or Firm*—William S. Frommer; Alvin Sinderbrand

[57] ABSTRACT

A parallel processor for processing a plurality of pieces of data includes a number of unitary processing units provided in parallel equal to the number of pieces of data. Each of the unitary processing units includes a memory circuit connected to a processing element which exchanges data with two adjoining unitary processing units. Each of the processing elements includes a full adder, a logical operation circuit for performing a logical operation on two inputs connected to a first input of the full adder and a plurality of selector circuits. A first selector circuit selects first data from memory circuits of the unitary processing unit and an adjoining unitary processing unit. A second selector circuit selects second data from memory circuits of the unitary processing unit and an adjoining unitary processing unit. A third selector circuit selects the second data selected by the second selector circuit as a first input to the logical operation circuit. A fourth selector circuit selects the first data selected by the first selector circuit as a second input to the logical operation circuit. A fifth selector circuit selects the second data selected by the second selector circuit as a second input to the full adder. A sixth selector circuit selects the carrier output of the full adder as a third input to the full adder.

8 Claims, 5 Drawing Sheets

PARALLEL PROCESSOR

BACKGROUND OF THE INVENTION

1. Field of the Invention

The present invention relates to a parallel processor to be used for processing image signals etc.

In a application having a Ser. No. of 08/340,854 filed on Nov. 15, 1994 now U.S. Pat. No. 5,535,151, assignee introduced a digital signal processor for image signals. The processor reduces the number of steps required for the logic operation of multiplication and therefore improves the operating speed of the processor.

2. Description of the Related Art

In general, a digital signal processor (DSP) using a parallel processor is comprised by constructing the processing section for performing processing on the image signals and the memory section for storing the image data of the pixels of the image signals and the results of the processing and other data by separate devices and connecting these devices by a data bus etc.

In a DSP of such a configuration, it is necessary to read the data from the memory section to the processing section at a speed commensurate with the speed of processing of the processing section or tow rite the data obtained as a result of the processing from the processing section to the memory section.

The speed of reading data from the memory section to the processing section, however, is limited by the bit width of the data bus and the speed of data input and output operations of the device used for the memory section, that is, the speed of communication between the processing section and the memory section. That is, the processing speed of the DSP itself ends up limited by the speed of communication between the processing section and the memory section. Accordingly, in the design of a DSP using separate devices for the processing section and the memory section, it is important to treat the data bus so as to enable the elimination of the limitation of the operating speed caused by the data bus connecting these devices. This is the most difficult problem in designing a high speed high performance DSP.

To solve the problem of the speed of communication between the processing section and memory section in a DSP where the processing section and memory section are realized by separate devices, in the field of processing of image signals, use has been made of parallel processors known as linear array processors.

Linear array processors were conceived for solving the problems caused by the speed of communication between the processing section and the memory section and constructs on the same device a processing circuit and memory circuit in accordance with the data included in the signals covered by the processing, that is, the image data included in one line's worth of image signals. It fetches the pixel data of the one line's worth of image signals into the memory circuit and then performs programmably the same processing on the pixels by the processing circuit corresponding to the pixel data. The processing in a linear array processor is also called "single instruction, multiple data (SIMD)" processing.

With a linear array processor, it is possible to eliminate the problems caused by the speed of communication between the processing section and the memory section, so it is possible to construct a high speed, high performance DSP.

As a linear array processor, there has been known in the past the one disclosed in Reference 1 "Childers, J. et al, SVP: Serial Video Processor, IEEE 1990 CICC, pp. 17.3.1 to 17.3.4". Further, there has been known the one of Reference 2 "TMC57100 Serial Video Processor User's Manual, Texas Instruments Co, 1990.".

The configuration of the processing circuit (processor element 8) of the conventional parallel processor described in Reference 1 will be explained below with reference to FIG. 1. Note that the processor element 8 shown in FIG. 1 is illustrated in FIG. 4-1 to FIG. 4-11 of the above Reference 2. To simplify the illustration, the sections of the RF0/DIR circuit 94 and the RF1/DOR circuit 96 are shown simplified.

The processor element 8 is comprised of an input signal selection circuit 80, a register (A) 82, a register (M) 84, a register (B) 86, a register (C) 90, an L/R control circuit 92, an RF0/DIR circuit 94, an RF1/DOR circuit 96, and an arithmetic circuit 98.

The input signal selection circuit 80 is comprised of two 2-input, 1-output multiplexers 800 and 802.

The register (A) 82, register (M) 85, and register (B) 86 are respectively comprised of 8-input, 1-output multiplexers 820, 840, and 860 and the D-flipflops 822, 842, and 862.

The register (C) 90 is comprised of two 2-input, 1-output multiplexers 900 and 902, an 8-input, 1-output multiplexer 904, and a D-flipflop 906.

The L/R control circuit 92 is comprised of a 4-input, 1-output multiplexer 920 and a 1024-input, 1-output NOR circuit 922 used in common for the processor elements 8 in a parallel processor using processor elements 8.

The arithmetic circuit 98 is comprised of an OR circuit 980, an AND circuit 982, and an ALU 984 operating as a full adder.

The parallel processor described in the above Reference 2 is comprised with a plurality of unitary (individual) processors, each comprised of a processor element 8 and memory circuit, connected in series. Further, it is provided with an input use shift register circuit for separating and supplying the pixel data corresponding to the unitary unit processors from the serial format image signals and an output use shift register for converting the result of the operation of the unitary processors to a serial signal and outputting the same.

In a linear array processor, it is necessary to provide the same number, for example, 2200, of unitary processors as the length of the data of the signals to be processed. The circuit configuration of the processor element 8, however, is redundant. When using processor elements 8 to construct a linear array processor, the circuit becomes large in size, so it is difficult to realize the entire circuit on a single device. Further, even if realized, the area of the device ends up becoming large and the device becomes extremely expensive.

In the processor element 8, four registers for supplying data to the ALU (arithmetic logic unit), that is, the registar (A) 82, the register (M) 84, the register (B) 86, and the register (C) 90, each have an 8-input 1-output multiplexer circuit. The numbers of these registers and multiplexers reach as high as 8800 for the 200 unit processors as a whole and become a major reason for the larger circuit size.

SUMMARY OF THE INVENTION

The parallel processor of the present invention was made in consideration of the above problems in the related art and in particular has as its object the provision of a parallel processor which reduces the circuit size of the registers for supplying data to the ALU and the multiplexers and reduces the redundancy of the circuit configuration of the processor elements without lowering the performance of the processor elements.

Further, it has as its second object the provision of a higher performance parallel processor which can reduce the circuit size of the unitary (individual) processors and increase the number of unitary processors on a single device.

Further, it has as its third object the provision of an inexpensive, high performance parallel processor which can realize the same number of unitary processors on a smaller device area.

To achieve the above objects, the parallel processor of the present invention provides a parallel processor for processing of an input signal comprised of a plurality of pieces of data per period, wherein provision is made of a plurality of unitary (individual) processing units provided in parallel in a number corresponding to the plurality of pieces of data and performing processing on each piece of data, each of the unitary processing units being comprised so as to enable the exchange of data with the two adjoining unitary processing units, each of the unitary processing units comprised of a memory circuit and a processor element connected to the memory circuit, each of the processor elements comprised of a full adder, a logical operation circuit for performing a logical operation on two inputs connected to a first input of the full adder, a first selector circuit for selecting one of a first data from a memory circuit in the unitary processing unit and a first data from a memory circuit in an adjoining unitary processing unit, a second selector circuit for selecting one of a second data from a memory circuit in the unitary processing unit and a second data from a memory circuit in an adjoining unitary processing unit, a third selector circuit for selecting one of the second data selected by the second selector circuit, the logical value 1, and the logical value 0 and outputting the same as a first input for the logical operation circuit, a fourth selector circuit for selecting one of the first data selected by the first selector circuit, the logical value 1, and the logical value 0 and outputting the same as a second input for the logical operation circuit, a fifth selector circuit for selecting one of the second data selected by the second selector circuit, the logical value 1, and the logical value 0 and outputting the same as a second input for the full adder, and a sixth selector circuit for selecting one of the carrier output of the full adder, the logical value 1, and the logical value 0 and outputting the same as a third input for the full adder.

The memory circuit is provided with a 1-bit 2-output bus and 1-input bus for each logical processing means. For example, it stores the data supplied from the data input means, for example, the 8-bit configuration pixel data and the intermediate values and results of the processing. The memory circuit supplies these values (data) as two 1-bit data to the data selecting means of the unitary operating unit and the adjoining unitary operating units and stores the results of the processing in units of one bit.

The first selector circuit and the second selector circuit have data buses which lay between the unitary processing units with memory circuits of the two adjoining unitary processing units placed at the proceeding stage and the following stage. The data selecting means inputs to the logical processing means two of the pieces of data input from the memory circuits of the two adjoining unitary processing units and data input from the memory circuit of the unitary processing unit and can perform the sending and transmission of data spanning the unitary processing units. Further, it can perform processing in a unitary processing unit using data of other unitary processing units.

The logical processing means selects the two pieces of data selected by the third selector circuit and the fourth selector circuit and the command for making the processor elements perform the same processing and supplies the same to the arithmetic means performing a predetermined logical operation.

The third to sixth selector circuits select the data selected by the first and second selector circuits in accordance with the command and supply them as the second and third inputs of the full adder and thereby reduce the size of the circuit of the processor element.

By making common use of those of the registers inside the third to sixth selector circuits and the registers belonging before the seventh selector circuit which have common input signals and clock signals, it is possible to reduce the size of the circuit of the processor element as well.

By omitting those of the registers inside the third to sixth selector circuits and the registers belonging before the seventh selector circuit which can be replaced by the sense amplifiers in the memory circuits, it is possible to reduce the size of the circuit of the processor element as well.

By grouping the clock signals and supplying them in accordance with the desired operations to the registers inside the third to sixth selector circuits and the registers belonging before the seventh selector circuit, it is also possible to greatly reduce the power consumption.

The full adder adds the two 1-bit input data and outputs the added value and the carrier. By performing the processing on data of a multiple-bit width one bit at a time, it is possible to process the multiple-bit data using a 1-bit full adder. Further, compared with an arithmetic means for multiple-bit parallel proceesing, a 1-bit full adder is smaller in size, so is suited for applications where an extremely large number of components are required such as in the parallel processor of the present invention.

BRIEF DESCRIPTION OF THE DRAWINGS

These and other objects and features of the present invention will become clearer from the following description of preferred embodiments given with reference to the accompanying drawings, wherein.

DESCRIPTION OF THE PREFERRED EMBODIMENTS

Figure 2:
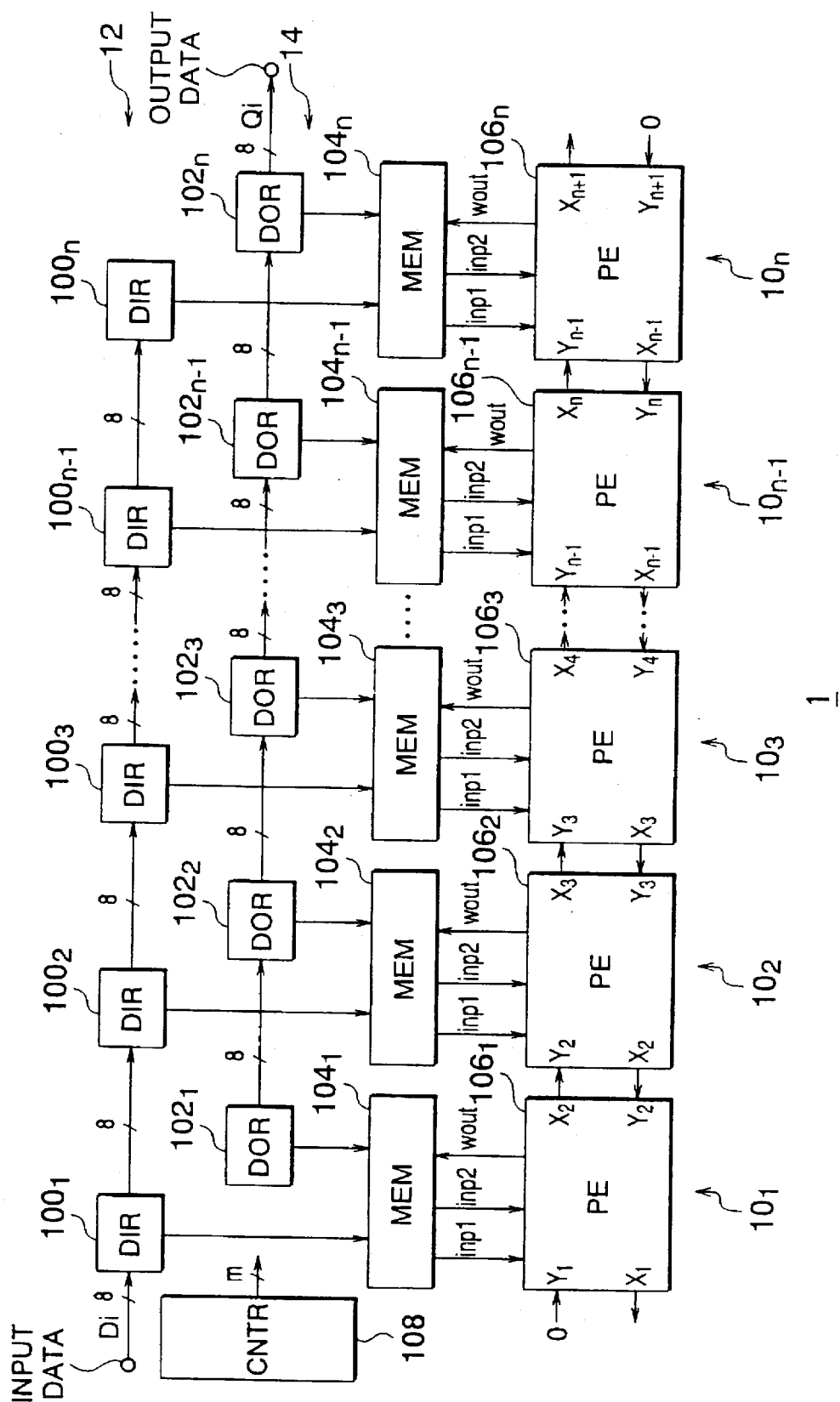
FIG. 2 is a view of the configuration of a parallel processor of the present invention.

FIG. 2 is a view of the configuration of a parallel processor 1 of the present invention.

The parallel processor 1 of the present invention is comprised of for example 768, 1024, or 2,200 unitary (individual) processing circuits 10$i$ connected in series in accordance with the number of pixels in one horizontal period of the image signals. It operates by the so-called single instruction multiple data (SIMD) system so as to perform parallel processing on the pixel data (pixel values Di) of the luminance signals of the pixels of one horizontal period (one line or 1H) worth of image signals.

The pixel values Di of one horizontal period's (one line or 1H) worth of image signals are successively input from the input data terminal serially in for example a horizontal period Hk (where k is an integer) into the parallel processor 1. The pixel values Di are converted by an input shift register 12 into a parallel form and are supplied to the memory circuit 104$i$ and the processing circuit 106$i$ in the horizontal blanking period Bk following the horizontal period Hk. In the next horizontal period Hk+1, predetermined processing is performed by the processing circuit 106$i$ on the pixel values Di. The processing results Qi are supplied to the output shift register 14 in the next horizontal blanking period Bk+1 and then are successively serially output from the output data terminal in the following horizontal period Hk+2.

Figure 1:
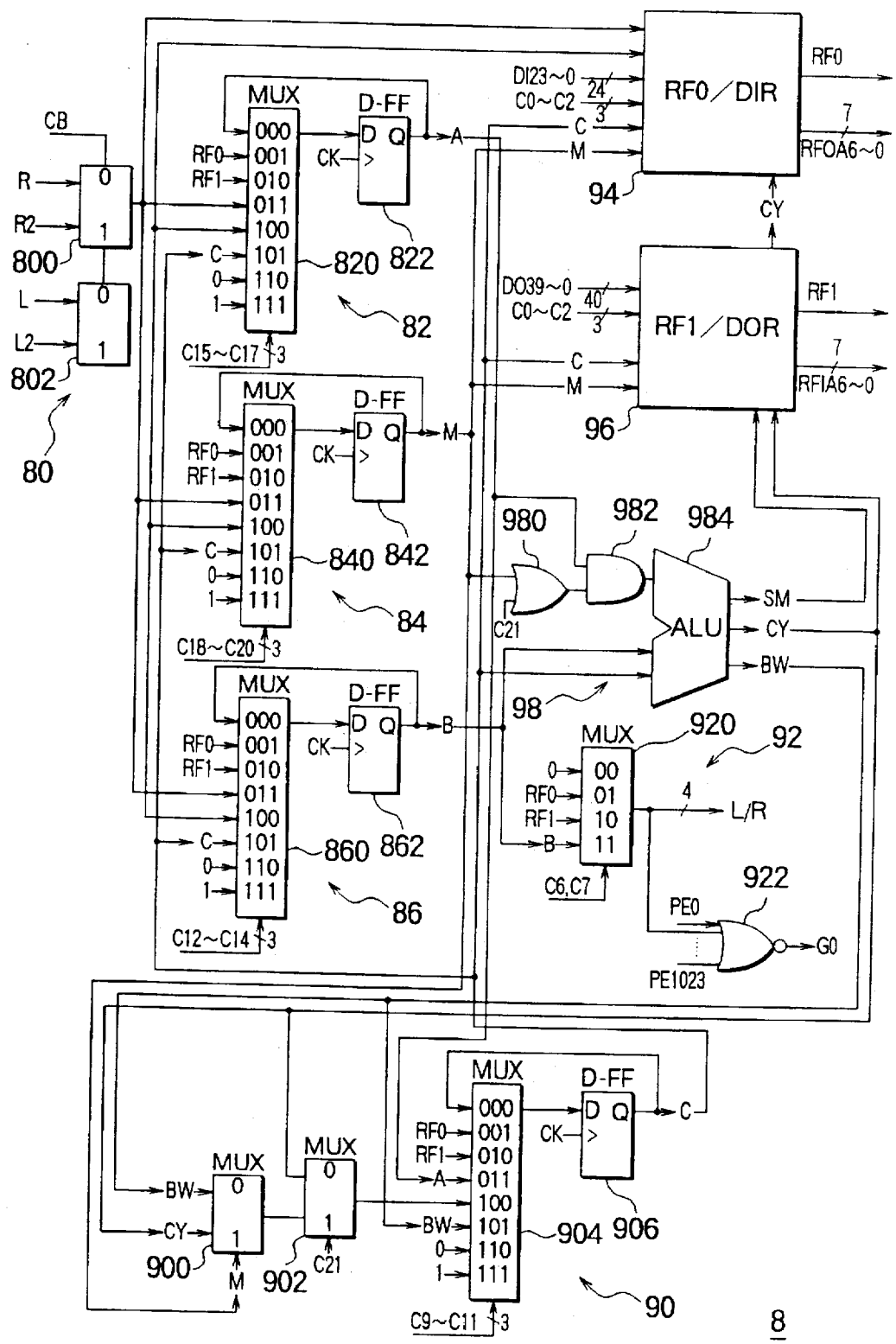
FIG. 1 is a view of the configuration of a conventional processor element.

The configuration of the parallel processor 1 will be explained next with reference to FIG. 1.

The data input registers 100$i$ (i=1, 2, ..., n) constitute an input shift register 12. These successively shift and hold the pixel values Di of the image signal of for example an 8-bit width output from the input data terminal to the parallel processor 1 in a horizontal period Hk and supply and store them in the memory circuits 104$i$ in the following horizontal blanking period Bk.

The data output registers 102$i$ constitute an output shift register 14. These store the processing results Qi corresponding to the pixel values Di subjected to the predetermined processing by the memory circuit 104$i$ and the processing circuits 106$i$ at the horizontal period Hk+1 in the following horizontal blanking period Bk+1 and successively shift and serially output the stored processing results Qi from the output data terminal in the horizontal period Hk+2.

Note that the data input registers 100$i$ and the data output registers 102$i$ will be explained in further detail later with reference to FIG. 3.

The memory circuits 104$i$ have for example a plurality of 8-bit registers. They store the data supplied from the data input registers 100$i$, supply any two pieces of data of 1-bit widths (1-bit data) stored in these 8-bit registers in accordance with the control from the control circuit (CNTR) 108 to the processing circuits 106$i$ through the read bit lines inp1 and inp2 of the processing circuits 106$i$, and reads in and stores the results of addition etc. of the processing circuits 106$i$ through the write bit line $w_{out}$.

The processing circuits 106$i$ are one-bit processors. They add the two 1-bit data which have been input or the numerical value 1 or numerical value 0 and the input one-bit data in one processing operation for example in accordance with control from the control circuit 108 and outputs the value of the result of addition (numerical value) or carrier to the memory circuits 104$i$.

Further, the processing circuits 106$i$ are each provided with 2-bit width data terminals Xi (X1$i$, X2$i$), Xi+1 (X1$i$+1, X2$i$+1) and data terminals Yi (Y1$i$, Y2$i$), Yi+1 (Y1$i$+1, Y2$i$+1) between the memory circuits 104$i$−1 and 104$i$+1 and the processing circuits 106$i$ −1 and 106$i$+1 of the unitary processing circuits 10$i$−1 and 10$i$+1 placed before and after the same (at a prior stage and later stage or adjoining) data terminals Yi (Y1$i$, Y2$i$), Yi+1 (Y1$i$+1, Y2$i$+1). It receives data from the data terminal Xi of the previous (proceeding) stage unitary processing circuit 10$i$−1 at the data terminal Yi, sends out data to the data terminal Yi+1 of the later (following) stage unitary processing circuit 10$i$+1 from the data terminal Xi+1, receives data from the terminal Xi of the previous stage unitary processing circuit 10$i$−1 at the data terminal Yi, and receives data from the data terminal Xi+1 of the later stage unitary processing circuit 10$i$+1 at the data terminal Yi+1. However, as shown in FIG. 2, there is no stage before the unitary processing circuit 101 and no stage after the unitary processing circuit 10$n$, so the numerical values 0 are input to the data terminals Y1 and Yn+1.

Using these data terminals Xi and Xi+1 and data terminals Yi and Yi+1, a unitary processing circuit 10$i$ can send and receive data with the adjoining unitary processing circuits 10$i$−1 and 10$i$+1 and can perform processing using the data of the adjoining unitary processing circuits 10$i$−1 and 10$i$+1.

The data input register 100$i$, the data output register 102$i$, the memory circuit 104$i$, and the processing circuit 106$i$ constitute a unitary processing circuit 10$i$. Note that the processor element and processing circuit and the unitary processor and unitary processing circuit are the same in meaning.

By having the processing circuit 106$i$ perform processing several times on the 8-bit data stored in the memory circuit 104$i$, it is possible to perform in the horizontal period Hk+1 predetermined processing on the pixel values Di input to the parallel processor 1 in the horizontal period Hk. Further, the control circuit 108 causes all of the memory circuits 104$i$ to read or write the same data, for example, the 1-bit data at the p-th (p=1, 2, 3, ...) bit of the m-th (m=1, 2, 3, ...) register of the memory circuit 104$i$. Alternatively, the control circuit 108 causes the processing circuit 106$i$ to perform the same processing. Accordingly, the unitary processing circuit 10$i$ performs the same processing on the pixel values Di which are input. That is, the parallel processor 1 is an SIMD type parallel processor.

The control circuit 108 controls the unitary processing circuits 10$i$ to make them perform the predetermined processing. Note that in FIG. 2, the control signals from the control circuit 108 to the components are omitted. Further, in the explanation made with reference to the above FIG. 2 as well, the description of the control signals was omitted. These points will be discussed later with reference to FIG. 3 and FIG. 4.

Next, an explanation will be made of the connections and operations of the portions constituting a unitary processing circuit 10$i$ referring to FIG. 3.

Figure 3:
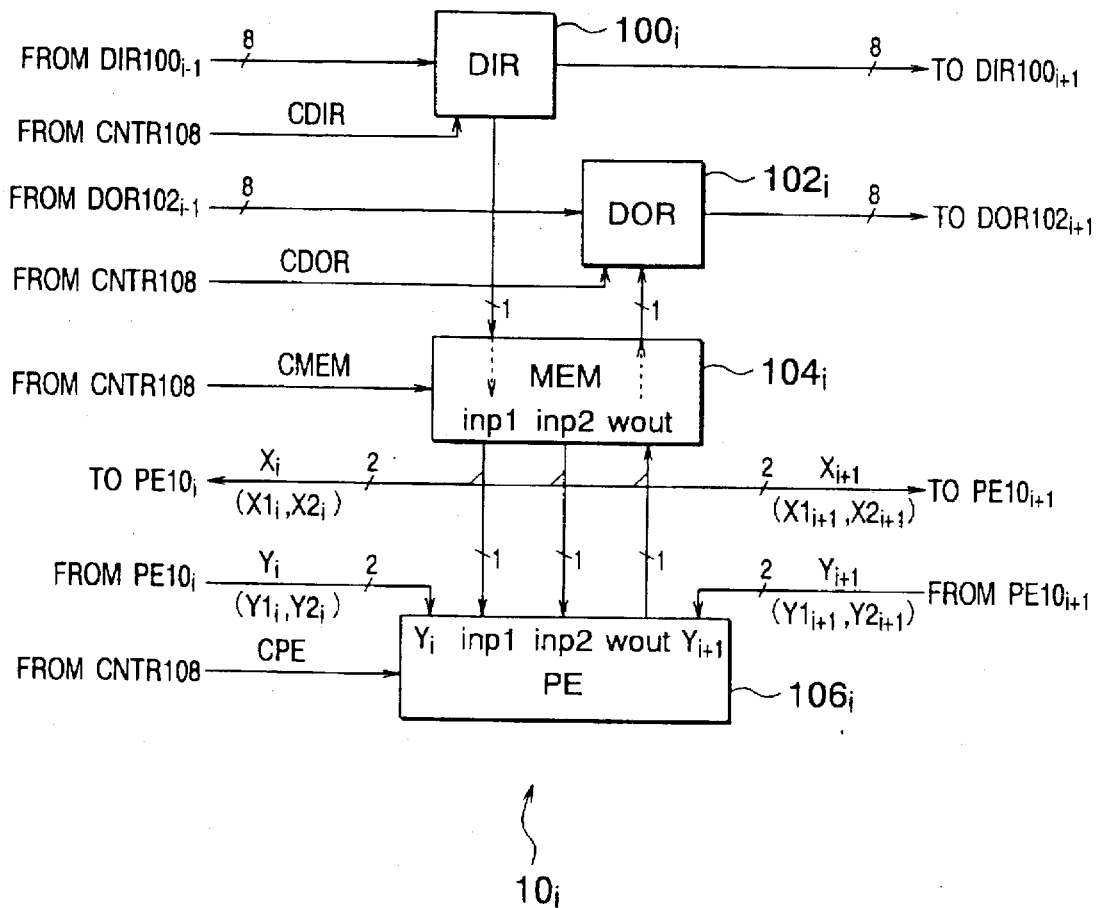
FIG. 3 is a view of the connection of the data input register (DIR), data output register (DOR), memory circuit (MEM), and processing circuit (PE) constituting an unitary processing circuit shown in FIG. 2.

FIG. 3 is a view of the connections among the data input register (DIR) 100$i$, the data output register (DOR) 102$i$, the memory circuit (MEM) 104$i$, and the processing circuit (PE) 106$i$ constituting the unitary processing circuit 10$i$ shown in FIG. 2. Note that the components of the unitary processing circuit 10$i$ shown in FIG. 3 are the same as the components of the parallel processor 1 shown given the same references in FIG. 2.

The data input register 100$i$, as mention before, is connected by an 8-bit width data bus to the data input registers 100$i$−1 and 100$i$+1 of the adjoining unitary processing circuits 10$i$−1 and 10$i$+1 and successively shifts its content to a later stage each time 8-bit width pixel values Di are input at the input data terminal of the parallel processor 1 in accordance with a control signal CDIR input from the control circuit 108. Accordingly, the data input register 100$i$ stores the pixel values Di at the point of time when the horizontal period ends.

At the next horizontal blanking period, the pixel values Di stored in the data input register 100$i$ are read out from the memory circuit 104$i$ and stored in accordance with the control signal CPE. Here, each bit of the data input register $100i$ is at the same memory space as the memory circuit $104i$. The pixel values Di are read out bit by bit at the memory circuit $104i$.

The data output register $102i$, as mentioned earlier, is connected to the data output registers $102i-1$ and $102i+1$ of the adjoining unitary processing circuits $10i-1$ and $10i+1$ by an 8-bit width data bus and successively shifts the content to a later stage each time an 8-bit width pixel value Di is input to the input data terminal of the parallel processor 1 in accordance with the control signal CDOR input from the control circuit 108. Accordingly, the processing result Qi stored in the output register $102i$ at the horizontal blanking period before a horizontal period is successively output at the same data rate (data speed) as the pixel data Di at the output data terminal of the parallel processor 1 in that horizontal period. Here the bits of the data output register $102i$ are at the same memory spaces as the memory circuit $104i$. The processing result Qi is written one bit at a time from the memory circuit $104i$.

The memory circuit $104i$ reads out and stores the pixel values Di from the data input register $100i$ in accordance with the control signal CMEM input from the control circuit 108 and writes and stores the processing result Qi in the data output register $102i$. Further, the memory circuit $104i$ supplies the value of any bit of any register from the read bit lines inp1 and inp2 of the processing circuit $106i$ through the processing circuit $106i$ and the terminals Xi and Xi+1 to the terminals Yi and Yi+1 of the processing circuits $106i-1$ and $106i+1$ of the adjoining unitary processing circuits $10i-1$ and $10i+1$ in accordance with the control signal CMEM. Further, the memory circuit $104i$ stores the results of addition etc. input from the processing circuit $106i$ through the write bit line $W_{out}$ at any bit of any register in accordance with the control signal CMEM input from the control circuit 108.

The processing circuit $106i$ receives data from the terminals Xi and Xi+1 of the memory circuit $104i$ and the memory circuits $104i+1$ and $104i+1$ of the adjoining unitary processing circuits $10i-1$ and $10i+1$ through the terminals Yi and Yi+1 of the processing circuit $106i$ in accordance with the control signal CPE input from the control circuit 108. Further, the processing circuit 1oui outputs and stores the result of addition etc. in the memory circuit $104i$ through the write bit line $W_{out}$ in accordance with the control signal CPE input from the control circuit 108.

The reason why the input and output of the processing circuit $106i$ and the memory circuit $104i$ are made two inputs and one output as seen from the processing circuit $106i$ side as shown in FIG. 2 is that the processing circuit $106i$ discussed later with reference to FIG. 3 is based on 2-input 1-output processing. Note that the full adder $240i$ of the processing circuit $106i$ is inherently 3-input 2-output, but one output and one input relating to the carrier are stored in the processing circuit $106i$ and two inputs and one output is enough for the processing circuit $106i$ as a whole.

Figure 4:
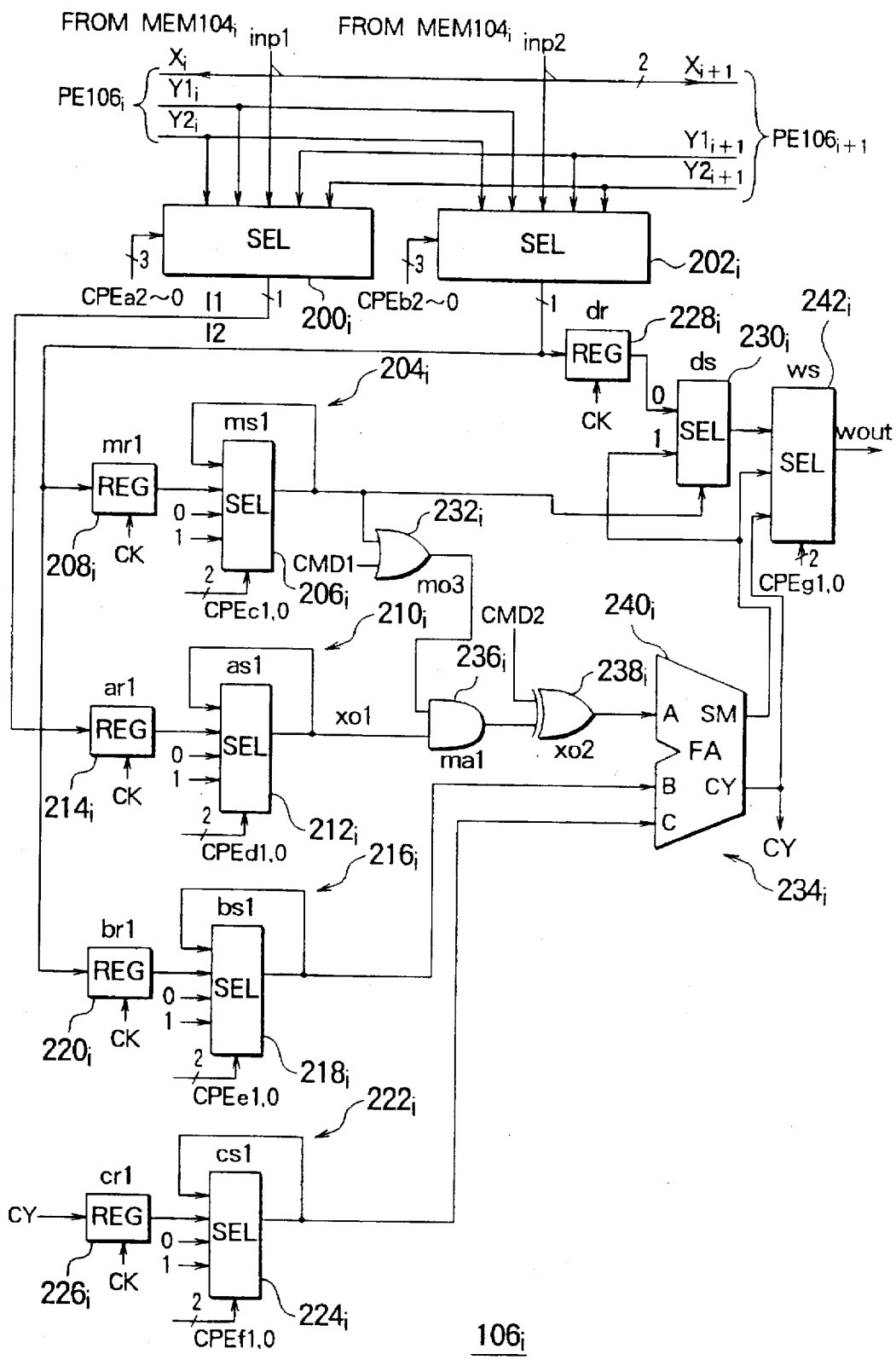
FIG. 4 is a view of the configuration of the processing circuit shown in FIG. 2 and FIG. 3.

Below, an explanation will be made of the configuration of the processing circuit $106i$ with reference to FIG. 4.

The processing circuit $106i$, as explained above, is a 1-bit processor of two inputs (inp1, inp2) and one output ($W_{out}$) having a full adder (FA) $200i$ as an arithmetic unit.

The selector circuit (SEL) $200i$ selects one among the two each, or total four 1-bit data, input from the read bit lines inp1 and inp2 of the memory circuits $104i-1$ and $104i+1$ of the adjoining unitary processing circuits $10i-1$ and $10i+1$ through the terminals Yi (Y1$i$, Y2$i$), Yi-1 (Y1$i$+1, Y2$i$+1), and the 1-bit data input from the read bit line inp1 of the memory circuit $104i$ and outputs it to the selector circuit (as1) $212i$ in accordance with the 3-bit width control signals CPEa2 to CPEa0 included in the control signal CPE input from the control circuit 108.

The selector circuit $202i$ selects one among the two each, or total four 1-bit data, input from the read bit lines inp1 and inp2 of the memory circuits $104i-1$ and $104i+1$ of the adjoining unitary processing circuits $10i-1$ and $10i+1$ through the terminals Yi and Yi+1 and the 1-bit data input from the read bit line inp2 of the memory circuit $104i$ and outputs it to the selector circuit (REG) $228i$, the selector circuit (ms1) $206i$, and the selector circuit (bs1) $218i$ in accordance with the 3-bit width control signals CPEb2 to CPEb0 included in the control signal CPE input from the control circuit 108.

The input selector (ms) $204i$ is comprised of a selector circuit $206i$ and a register circuit (mr1) $208i$. The register circuit $208i$ latches and holds the signal I2 input from the selector circuit $202i$ at a timing when the clock signal CK included in the control signal CPE becomes valid (assert) and outputs it to the selector circuit $206i$. The selector circuit $206i$ selects one of the output signal of the selector circuit $206i$, the output signal of the register circuit $208i$, and the numerical values 1 and 0 in accordance with the control signals CPEc1 and CPEc0 included in the control signal CPE input from the control circuit 108 and outputs the same to the OR circuit (mo3) and the selected signal input terminal of the selector circuit (ds) $230i$. Here, the clock signal CK defines the operating period of the processing circuit $106i$.

Explaining the operation of the input selector (ms) $204i$, when the clock signal CK is made valid, the value of the output signal of the selector circuit $202i$ before that is held in the register circuit $208i$.

When the selector circuit $206i$ selects the output signal of the register circuit $208i$, the value of the output signal of the input selector (ms) $204i$ becomes the value of the output signal of the register circuit $208i$. When the selector circuit $206i$ selects the numerical value 1, the value of the output signal of the input selector (ms) $204i$ becomes the numerical value 1. When the selector circuit $206i$ selects the numerical value 0, the value of the output signal of the input selector (ms) $204i$ becomes the numerical value 0. When the selector circuit $206i$ selects the signal of the selector circuit $206i$ itself, the previous value is latched for the output signal of $204i$.

The input selector (ms) $204i$ has the role of masking the output signal of the input selector (ms) $204i$. That is, when the logical value of the output signal of the input selector (ms) $204i$ or the command signal CMD1 is 1, the output signal of the AND circuit $236i$ matches the output signal of the input selector (ms) $204i$, while when the logical values of the output signal of the input selector (ms) $204i$ and the command signal CMD1 are 0, the output signal of the AND circuit $236i$ always becomes the logical value 0.

Further, the input selector (me) $204i$ has the role of storing the branch conditions for each processing circuit $106i$. In a SIMD type parallel processor such as the parallel processor 1, it is not possible to set by software the selection (branch conditions) of the output data by conditions for each unitary processing circuit $10i$. Accordingly, the output signal of the input selector (ms) $204i$ is used to control the selector circuit $230i$ and realize the processing of the branch conditions by hardware.

The input selector (as) $210i$ is comprised of a selector circuit $212i$ and a register circuit (ar1) $214i$. The register circuit 214i latches and holds the signal I1 input from the selector circuit 200i at a timing when the clock signal CK included in the control signal CPE becomes valid (assert) and outputs it to the selector circuit 212i. The selector circuit 212i selects one of the output signal of the selector circuit 212i itself, the output signal of the register circuit 214i, and the numerical values 1 and 0 in accordance with the control signals CPEd1 and CPEd0 included in the control signal CPE input from the control circuit 108 and outputs the same to the AND circuit (ma1) 236i.

Explaining the operation of the input selector (as) 210i, when the clock signal CK is made valid, the value of the output signal of the selector circuit 200i before that is held in the register circuit 214i.

When the selector circuit 212i selects the output signal of the register circuit 214i, the value of the output signal of the input selector (as) 210i becomes the value of the output signal of the register circuit 214i. When the selector circuit 212i selects the numerical value 1, the value of the output signal of the input selector (as) 210i becomes the numerical value 1. When the selector circuit 212i selects the numerical value 0, the value of the output signal of the input selector (as) 210i becomes the numerical value 0. When the selector circuit 212i selects the signal of the selector circuit 212i itself, the previous value is latched for the output signal of 210i. When it selects the signal of the selector circuit 224i itself, the previous value is latched for the output signal of 222i.

The input selector (bs) 216i is comprised of the selector circuit 218i and the register circuit (br1) 220i. The register circuit 220i latches and holds the signal I2 input from the selector circuit 202i at a timing when the clock signal CK included in the control signal CPE becomes valid (assert) and outputs it to the selector circuit 218i. The selector circuit 218i selects one of the output signal of the selector circuit 218i itself, the output signal of the register circuit 220i, and the numerical values 1 and 0 in accordance with the control signals CPEe1 and CPEe0 included in the control signal CPE input from the control circuit 108 and outputs the same to the terminal B of the full adder 240i.

Explaining the operation of the input selector (bs) 216i, when the clock signal CK is made valid, the value of the output signal of the selector circuit 202i before that is held in the register circuit 220i.

When the selector circuit 218i selects the output signal of the register circuit 220i, the value of the output signal of the input selector (bs) 216i becomes the value of the output signal of the register circuit 220i. When the selector circuit 218i selects the numerical value 1, the value of the output signal of the input selector (bs) 216i becomes the numerical value 1. When the selector circuit 218i selects the numerical value 0, the value of the output signal of the input selector (bs) 216i becomes the numerical value 0. When the selector circuit 218i selects the signal of the selector circuit 218i itself, the previous value is latched for the output signal of 216i.

The input selector (cs) 221i is comprised of a selector circuit 221i and a register circuit (cr1) 226i. The register circuit 226i latches and holds the signal (CY) input from the full adder 240i at a timing when the clock signal CK included in the control signal CPE becomes valid (assert) and outputs it to the selector circuit 224i. The selector circuit 224i selects one of the output signal of the selector circuit 224i itself, the output signal of the register circuit 226i, and the numerical values 1 and 0 in accordance with the control signals CPEf1 and CPEf0 included in the control signal CPE input from the control circuit 108 and outputs the same to the terminal C of the full adder 240i.

Explaining the operation of the input selector (cs) 222i, when the clock signal CK is made valid, the value of the carrier output signal (CY) of the full adder 240i before that is held in the register circuit 226i.

When the selector circuit 221i selects the output signal of the register circuit 226i, the value of the output signal of the input selector (cs) 222i becomes the value of the output signal of the register circuit 226i. When the selector circuit 224i selects the numerical value 1, the value of the output signal of the input selector (cs) 222i becomes the numerical value 1. When the selector circuit 224i selects the numerical value 0, the value of the output signal of the input selector (cs) 222i becomes the numerical value 0. When the selector circuit 224i selects the signal of the selector circuit 224i itself, the previous value is latched for the output signal of 222i. By selecting the signals input to the full adder 240i by the input selector (as) 210i, the input selector (bs) 216i, and the input selector (cs) 222i, it is possible to use the full adder 240i for various applications.

The register circuit 228i latches the signal I2 at a timing when the clock signal CK becomes valid and outputs the same to the selector circuit 230i. The selector circuit 228i has the role of matching the timing between the signal I2 input to the selector circuit 230i and the output signals (signal SM, signal CY) of the full adder 240i.

The OR circuit 232i performs an OR operation between the output signal of the register circuit 208i and the command signal CMD1 included in the control signal CPE and outputs the result to the AND circuit 236i. When the command signal CMD1 is the logical value 1, the logical value of the OR circuit 232i always becomes 1. Accordingly, the output signal of the AND circuit 236i always matches the output signal of the input selector (as) 210i. Further, only when the logical value of the command signal CMD1 is 0 and the logical value of the output signal of the input selector (ms) 204i is 0, the logical value of the output signal of the AND circuit 236i always becomes 0 and is masked. That is, the command signal CMD1 has the role of controlling the masking of the output signal of the input selector (as) 210i by the output signal of the input selector (ms) 204i.

The XOR circuit (xo2) 238i performs an EXCLUSIVE-OR operation between the command signal CMD2 contained in the control signal CPE and the output signal of the AND circuit 236i and outputs the result to the full adder 240i. When the command signal CMD2 is the logical value 1, the output signal of the XOR circuit 238i becomes a signal inverted from the logical value of the output signal of the AND circuit 236i, while when the command signal CMD2 is the logical value 0, the logical value of the XOR circuit 238i matches with the output signal of the AND circuit 236i. Accordingly, the command signal CMD2 is used for inverting the logical value of the output signal of the input selector (as) 210i.

The full adder 240i performs full addition arithmetic processing based on the output signal of the XOR circuit 238i, the output signal of the input selector (bs) 216i, and the output signal of the input selector (cs) 222i and outputs the result of the addition (numerical value: signal SM) to the selector circuit 242i and the carrier of the result of addition (signal CY) to the selector circuit (ws) 242i and the selector circuit 224i. The relationship between the input signal and output signal of the full adder 240i is as shown in the following table:

TABLE 1

| A input | B input | C input | SM output | CY output |
|---|---|---|---|---|
| 0 | 0 | 0 | 0 | 0 |
| 1 | 0 | 0 | 1 | 0 |
| 0 | 1 | 0 | 1 | 0 |
| 1 | 1 | 0 | 0 | 1 |
| 0 | 0 | 1 | 1 | 0 |
| 1 | 0 | 1 | 0 | 1 |
| 0 | 1 | 1 | 0 | 1 |
| 1 | 1 | 1 | 1 | 1 |

The selector circuit 230i selects the output signal of the register circuit 228i when the logical value of the output signal of the input selector (ms) 204i is 0, selects the signal SM when the logical value of the output signal of the input selector (ms) 204i is 1, and outputs the same to the selector circuit 242i.

The selector circuit 242i selects one of the output signal of the selector circuit 230i, the signal SM, and the signal CY in accordance with the control signals CPEg1 and CPEg0 included in the control signals CPE input from the control circuit 108 and outputs the same from the write bit line $W_{out}$ of the processing circuit 106i.

Note that among the above-mentioned components of the parallel processor 1, the processing circuit 106i corresponds to a processor element according to the present invention, the selector circuits 200i and 202i correspond to the first and second selector circuits according to the present invention, and the memory circuit 104i corresponds to the memory circuit according to the present invention.

Further, the full adder 240i corresponds to the arithmetic processing means according to the present invention, the input selector (ms) 204i, the input selector (as) 210i, the input selector (bs) 216i, and the input selector (cs) 222i correspond to the third to sixth selector circuits according to the present invention, the OR circuit 232i, the AND circuit 236i, and the XOR circuit 238i correspond to the logical processing means of the present invention, the selector circuit 230i and the selector circuit 238i correspond to the seventh and eighth selector circuits according to the present invention, the register circuit 228i corresponds to the register circuit according to the present invention, and the register circuits 208i, 214i, 220i, and 226i correspond to the registers inside the third to sixth selector circuits according to the present invention.

Below, an explanation will be made of the operation of the parallel processor 1.

First, an explanation will be made of the overall operation of the parallel processor 1.

In the horizontal period Hk, the pixel values Di of the 8-bit wide image signals are successively input to the parallel processor 1 from the input data terminal. The data input register 100i of the input shift register 12 successively shifts the input pixel values Di in accordance with the control signal CDIR of the control circuit 108. At the point of time when the horizontal period Hk ends, the pixel values Di are held at the corresponding data input register 100i.

Note that at the same time, at the horizontal period Hk, the memory circuit 104i and the processing circuit 106i perform processing for obtaining the processing result 'Qi from the pixel values 'Di input at the horizontal period Hk−2, while the output shift register 14 successively outputs the processing result "Qi corresponding to the pixel value "Di input at the horizontal period Hk−2 from the output data terminal of the parallel processor 1.

At the next horizontal blanking period Bk, the memory circuit 104i reads the pixel values Di bit by bit in accordance with the control signal CMEM and stores the same at a predetermined address of the memory circuit 104i.

Note that at the same time, in the horizontal blanking period Bk, the processing result 'Qi corresponding to the pixel values 'Di input at the horizontal period Hk−1 are written in the output shift register 14.

At the next horizontal period Hk+1, the processing circuit 106i and the memory circuit 104i perform processing bit by bit on the pixel values Di−1, Di, and Di+1 stored in the memory circuits 104i and the memory circuits 104i−1 and 104i+1 of the adjoining unitary processing circuits 10i−1 and 10i+1 and the intermediate values of the processing at the processing circuits 106i−1, 106i, and 106i+1 in accordance with the control signals CPE and CMEM input from the control circuit 108 so as to calculate the processing result Qi. The processing result Qi calculated are stored at a predetermined address of the memory circuit 104i.

Note that at the same time, at the horizontal period Hk+1, the next pixel values Di' are successively input to the input shift register 12 and the processing result 'Qi is successively output from the output shift register 14.

In the following horizontal blanking period Bk+1, the memory circuit 104i writes the processing result Qi in the data output register 102i of the output shift register 14 bit by bit in accordance with the control signal CMEM input from the control circuit 108.

Note that at the same time, in the horizontal blanking period Bk+1, the pixel values Di' input in the horizontal blanking period Hk+1 are read from the input shift register 12 to the memory circuit 104i i.

At the next horizontal period Hk+2, the output shift register 14 successively shifts the processing result Qi written according to the control signal CDOR of the control circuit 108 and successively outputs the same from the output data terminal of the parallel processor 1.

Note that at the same time, at the horizontal period Hk+2, the next pixel values Di" are successively input to the input shift register 12. The memory circuit 104i and the processing circuit 106i perform the processing to calculate the processing result Qi' for the pixel values Di' input in the horizontal period Hk+1.

In the above way, the unitary processing circuit 10i of the parallel processor 1 successively performs processing by the memory circuit 104i and the processing circuit 106i on the pixel values Di successively input from the input shift register 12 in accordance with the control of the control circuit 108, calculates the processing result Qi, and outputs the same from the successive output shift register 14.

Below, an explanation will be made of the fact that various processing operations are made possible by the processing circuit 106i.

First, an explanation will be made of the logical operations.

The logical operation is performed by the processing circuit 106i by first setting the command signal CMD1 and the command signal CMD2 to the logical value 0 by the control circuit 108, then setting the control signals CPEd1, CPEd0, CPEe1, CPEe0, CPEf1, and CPEf0 and setting the output signals of the input selector (as) 210i, the input selector (bs) 216i, and the input selector (cs) 222i by the control circuit 108, and then setting the control signals CPEg1 and CPEg0 and outputting one of the signals SM and CY.

That is, it is possible to make the logical value of the output signal of the input selector (cs) 222*i* 0 and obtain at the signal CY the results of the AND operation of the output signals of the input selector (as) 210*i* and the input selector (bs) 216*i*.

Further, it is possible to make the logical value of the output signal of the input selector (cs) 222*i* 1 and obtain at the signal CY the result of the OR operation of the output signals of the input selector (as) 210*i* and the input selector (bs) 216*i*.

Further, it is possible to make the logical value of the output signal of the input selector (cs) 222*i* 0 and obtain at the signal SM the result of the XOR operation of the output signals of the input selector (as) 210*i* and the input selector (bs) 216*i*.

Further, it is possible to make the logical value of the output signal of the input selector (cs) 222*i* 1 and obtain at the signal SM the result of the XNOR operation of the output signals of the input selector (as) 210*i* and the input selector (bs) 216*i*.

Further, it is possible to make the logical value of the output signal of the input selector (bs) 216*i* 0 and the logical value of the output signal of the input selector 222*i* 1 and obtain at the signal SM the result of the NOT operation of the input signal to the terminal A of the full adder 240*i*.

Further, it is possible to make the logical value of the output signal of the input selector (bs) 216*i* 0, the logical value of the output signal of the input selector 222*i* 1, and the logical value of the command signal CMD1 1 and obtain at the signal SM the results of the NAND operation of the logical values of the output signals of the input selector (as) 210*i* and the input selector (ms) 204*i*.

By repeating these logical operations, in other words by performing complex logical operation, it is possible to realize any logical operation. For example, it is possible to perform a NAND operation by a complex logical operation in addition to a NAND operation by one operating period.

First, in the first operating period of the processing circuit 106*i*, the control circuit 108 makes the logical value of the output signal of the input selector (cs) 222*i* 0 and controls the selector circuit 242*i* to store the signal CY in the memory circuit 104*i*.

Next, at the second operating period, the control circuit 108 inputs the result of the AND operation at the first operating period, stored in the memory circuit 104*i*, at the terminal A of the full adder 240*i*, makes the logical value of the output signal of the input selector (bs) 216*i* 0, sets the logical value of the output signal of the input selector (cs) 222*i* 1, and thereby can obtain the results of a NAND operation in two operating periods.

In this way, using complex logical operations, it is possible to perform any processing on any data stored in the memory circuit 104*i* etc.

Further, an explanation will be made of the main processing.

The addition operation of the 2's-complement form on the two pieces of data stored in the memory circuit 104*i* by the processing circuit 106*i* is performed as follow:

The full adder 240*i* can perform full addition processing, so can perform an addition operation on two pieces of multiple bit data, for example, the 8-bit pixel values Di and the constant A, stored in the memory circuit 104*i* by processing of several operations.

First, at the first operating period, the control circuit 108 causes the input selector (cs) 222*i* to output the logical value 0 and sets the logical value 0 for the command signal CMD1 and the command signal CHD2. Further, it outputs the LSB (least significant bit; bit 0) of the pixel value Di and constant A covered by this addition operation through the selector circuits 200*i* and 202*i* as the signals I1 and I2 to the input selector (as) 210*i* and the input selector (bs) 216*i*. It makes these the output signals and causes them to be output to the terminal A and terminal B of the full adder 240*i*. Further, it controls the selector circuit 242*i* to cause the signal SM to be output from the write bit line $W_{out}$, stores it in the LSB of the predetermined address of the memory circuit 104*i*, causes the signal CY to be output at the input selector (cs) 222*i*, and causes it to be output to the terminal C of the full adder 240*i*.

Next, the control circuit 108 performs an addition operation from the lower bits of the pixel data Di and the constant A successively with each next operating period and writes the results from the lower bit of the predetermined address of the memory circuit 104*i*.

That is, the control circuit 108 causes the pixel values Di and the constant A to be successively read from the lower bit to the input selector (as) 210*i* and the register circuit 214*i* every operating period, causes the input selector (cs) 222*i* to output the signal CY of one operating period before, and outputs the same to the full adder 240*i*. It successively writes the signal SM obtained as a result from the lower bit of the predetermined address of the memory circuit 104*i*.

By the control circuit 108 having the processing circuit 106*i* perform the above-mentioned processing up to the MSB (most significant bit: bit 7) of the pixel values Di and the constant A, it is possible to perform an addition operation on multiple bit data.

Note that, similarly, by performing substantially the same processing as the addition operation of the 2's-complement form by the processing circuit 106*i*, it is also possible to perform a subtraction operation by the 2's-complement form.

That is, when subtracting the constant A from the pixel value Di, first, at the first operating period, the control circuit 108 causes the input selector (cs) 222*i* to output the logical value 1 and sets the logical value 0 for the command signal CMD1 and the logical value 1 for the command signal CMD2. Further, it causes the input selector (as) 210*i* to output the value of the LSB of the constant value A, that is, the subtrahend, causes the input selector (bs) 216*i* to output the LSB of the pixel value Di, that is, the minuend, and causes these to be output to the terminal A and terminal B of the full adder 240*i*. Further, it controls the selector circuit 242*i* to cause the output of the signal SM from the write bit line $W_{out}$, stores the same at the LSB of the predetermined address of the memory circuit 104*i*, and causes the signal CY to be output to the terminal C of the full adder 240*i* as the output of the input selector (cs) 222*i*.

Next, with each next operating period, the control circuit 108 successively performs an addition operation on the pixel value Di and the lower bit of the constant A and writes the results from the lower bit of the predetermined address of the memory circuit 104*i*.

That is, the control circuit 108 causes the input selector (as) 210*i* and the register circuit 214*i* to successively read the pixel value Di and the constant A from the lower bit each operating period, causes the input selector (cs) 222*i* to output the signal CY of the previous operating period, and outputs the same to the full adder 240*i*. It then causes the signal SM obtained as a result to be written successively from the lower bit of the predetermined address of the memory circuit 104*i*.

By the control circuit 108 causing the processing circuit 106i to perform the above-mentioned processing until the MSB (bit 7) of the pixel values Di and the constant A, it becomes possible to perform a subtraction operation on multiple bit data.

The differences between the above-mentioned addition operation and subtraction operation are that the output of the input selector (cs) 222i at the time of an operation on the LSB is the logical value 1, the subtrahend is input from the terminal A of the full adder 240i and the minuend is input from the terminal B of the full adder 240i, and the command signal CMD2 is set to the logical value 1.

Below, an explanation will be made of the multiplication operation by the processing circuit 106i.

The multiplication operation of the binary form (straight binary) using two pieces of data stored in the memory circuit 104i by the processing circuit 106i, for example, the multiplicand as the pixel value Di and the multiplier as the constant A, as explained below, is performed by shifting and adding the multiplicand in accordance with the multiplier.

First, the control circuit 108 inputs the LSB of the multiplier (constant A) as the signal I2 in the processing circuit 106i from the read bit line inp2 of the memory circuit 104i, causes the input selector (ms) 204i to output the signal I2 of the multiplier, and sets the logical value 1 in the command signal CMD1. By these settings, when the logical value of the output signal of the input selector (ms) 204i is 1, the LSB of the multiplier is input to the terminal A of the full adder 240i and, when the logical value of the output signal of the input selector (ms) 204i is 0, the logical value 0 is input to the terminal A of the full adder 240i. Further, the control circuit 108 sets things so as to cause the input selector (bs) 216i and the input selector (cs) 222i to input the logical value 0 to the terminal B and the terminal C of the full adder 240i.

After performing the above setting, the control circuit 108 causes the memory circuit 104i to successively input the multiplicand (pixel value Di) from the LSB to the processing circuit 106i as the signal I1 through the read bit line inp1 with each operating period of the processing circuit 106i, causes the value of the signal I1 to be output from the input selector (as) 210i, and writes the value of the output signal of the terminal SM of the full adder 240i obtained as the intermediate result of multiplication at a predetermined address from the LSB of the predetermined address of the memory circuit 104i.

The multiplication operation for the LSB of the multiplier ends with the above processing.

The multiplication operation for the bit 1 to bit 7 of the multiplier is as follows:

The control circuit 108 causes the memory circuit 104i to output the value of one higher bit of the multiplier, that is, the value of the bit q of the multiplier in the case where multiplication operation of the bit (q−1) (q=1, 2, . . . , 7) of the multiplier is performed by the prior operation, as the signal I2 to the processing circuit 106i and causes the value of the signal I2 to be output to the input selector (ms) 204i.

When performing an operation on the LSB of the multiplicand, the control circuit 108, like with the above addition operation, causes the input selector (cs) 222i to output the logical value 0 to the terminal C of the full adder 240i and, when performing processing on bits other than the LSB of the multiplicand (bit 1 to bit 7), sets things to cause the input selector (cs) 222i to output the value of the output signal of the terminal CY of the full adder 240i at the previous operating period to the terminal C of the full adder 240i.

Next, the control circuit 108 causes the memory circuit to receive as input the bit 0 to bit 7 of the multiplicand and causes the processing circuit 106i to receive as input the signal I1, causes the input selector (as) 210i to successively output the values of the bit 0 to bit 7 of the multiplicand and, each time, causes the processing results to be obtained from the terminal SM of the full adder 240i, and causes the bits to be successively stored at a predetermined address of the memory circuit 104i from the LSB of the working buffer W.

Further, the control circuit 108 causes the memory circuit 104i and processing circuit 106i to add the value stored in the working buffer and from the bit q to the bit (q+7) of the intermediate result of multiplication stored in the memory circuit 104i by the above mentioned addition operation and causes the result of the addition to be stored in the intermediate result of the multiplication.

The control circuit 108 causes the memory circuit 104i and the processing circuit 106i to perform processing on the bit q of the above multiplier from the bit 0 to the bit 7 of the multiplier so as to perform the multiplication operation of the multiplier and the multiplicand.

The above multiplication operation will be explained with reference to the following table. Note that in the following table, for convenience in description, a 4-bit long multiplier and a 4-bit long multiplicand are shown.

As shown in the following table, multiplication is performed on all of the bits D0 to D3 (D0 to D7 in the above explanation) of the multiplicand with respect to the bits A0 to A3 of the multiplier. These are added and the results stored in the working buffer W.

That is, the content of the working buffer W becomes (A0*D3+A0*D2+A0*D1+A0*D0) at the point of time when the processing of the bit 0 (A0) of the multiplier A ends, becomes (A1*D3+A1*D2+A1*D1+A1*D0) at the point of time when the processing of the bit 1 (A1) of the multiplier A ends, becomes (A2*D3+A2*D2+A2*D1+A2*D0) at the point of time when the processing of the bit 2 (A2) of the multiplier A ends, and becomes (A3*D3+A3*D2+A3*D1+A3*D0) at the point of time when the processing of the bit 3 (A3) of the multiplier A ends. These values are added at a predetermined position of the intermediate result of the multiplication. A carrier is written at the bit 7 (S7) of the result of the multiplication operation and thereby the result of the multiplication operation is obtained.

| A0; W0 = | | | A0*D3+A0*D2+A0*D1+A0*D0 | | | | |
|---|---|---|---|---|---|---|---|
| A1; W1 = | | | A1*D3+A1*D2+A1*D1+A1*D0+0 | | | | |
| A2; W2 = | | | A2*D3+A2*D2+A2*D1+A2*D0+0 | | | | |
| A3; W3 = | | | A3*D3+A3*D2+A3*D1+A3*D0+0+0+0 | | | | |
| S7 | S6 | S5 | S4 | S3 | S2 | S1 | S0 |
| S = W0+W1+W2+W3 | | | | | | | | where,

A0 to A3 are the bits of the multiplier A

D0 to D3 are the bits of the multiplicand Di

S0 to S7 are the bits of the result of the multiplication operation

W is the content of the working buffer W

* shows multiplication.

Below, an explanation will be made of the method of changing the content of the processing at the processing circuit 106i in accordance with the logical values of the bits of the data showing the conditions (condition data) stored in the memory circuits 104i for each processing circuit 106i.

The control circuit 108 causes the memory circuit 104i to output a predetermined bit of the condition data to the processing circuit 106$i$, causes that value to be output from the input selector (ms) 204$i$, and causes the selector circuit 230$i$ robe controlled. Further, the control circuit 108 controls the selector circuit 242$i$ to cause the output signal of the selector circuit 230$i$ to be output from the write bit line W$_{out}$ so as to enable different processing to be performed at each of the processing circuits 106$i$ by the condition data stored in the memory circuit 104$i$. That is, the control circuit 108 can make the value of the signal I2 or any value of the signal SM the value of the output signal from the write bit line W$_{out}$ of the processing circuit 106$i$.

Below, an explanation will be made of the method of finding the absolute value of the data of the 2's-complement form, for example, the pixel value Di, using this conditional branching.

First, the control circuit 108 sets the command signal CMD1 to the logical value 0, sets the command signal CMD2 to the logical value 1, causes the memory circuit 104$i$ to output a sign bit showing the sign of the pixel values Di to the processing circuit 106$i$, and causes the input selector (ms) 204$i$ to output the sign bit. Further, the control circuit 108 causes the memory circuit 104$i$ to receive as input the bits of the pixel values Di successively from the LSB through the read bit line inp2 as the signal I2, causes the input selector (cs) 222$i$ to output the logical value 1 in the processing relating to the LSB of the pixel value Di, causes the input selector (as) 210$i$ to output the logical value 0, causes the input selector (cs) 222$i$ to output the value of the signal CY in the processing relating to other than the LSB of the pixel value Di, and causes the input selector (as) 210$i$ to output the logical value 0.

In the above setting, the processing circuit 106$i$ outputs the signal I2 as it is from the write bit line W$_{out}$ when the sign bit is a logical value 0. On the other hand, the signal SM of the full adder 240$i$ is a value of all of the bits if the pixel values Di inverted and added with 1, in other words, the values of the signs of the pixel values Di inverted.

That is, the control circuit 108 can cause the selector circuit 230$i$ to select the signal SM and cause the values of the pixel values Di inverted in sign to be output from the write bit line W$_{out}$ through the selector circuit 242$i$ when the sign bit of the pixel values Di is the logical 1, that is, the pixel values Di are negative, and can cause the selector circuits 230$i$ to select the signal I2 and cause the pixel values Di robe output from the write bit line W$_{out}$ as they are when the sign bit of the pixel values Di is the logical 0, that is, the pixel values Di are positive.

Note that in the above embodiment of a parallel processor of the present invention, illustration was made of processing of a logical operation, addition operation, subtraction operation, multiplication operation, and for calculating absolute values performed by the processing circuit 106$i$, but in the parallel processor 1 of the present invention, it is also possible to combine these processings in any way and perform any processing on the pixel values Di and other information stored in the memory circuit 104$i$.

Further, the multiplication operation processing on data of the 2's-complement form can be performed by substantially the same processing comprised of the multiplication operation on the simple binary numbers mentioned above plus the processing relating to the sign bit.

Further, in the above embodiments, the processing circuit 106$i$ was comprised so as to receive as input the signal I1 at the input selector (as) 210$i$ and to receive as input the signal I2 at the input selector (bs) 216$i$. This configuration is derived from the input/output configuration (1-bank 2-port configuration) of the parallel processor 1.

Further, by suitably changing the content of the control signal CMEM input from the control circuit 108 to the memory circuit 104$i$, it is also possible to replace the data and supply that data to the terminal A and terminal B of the full adder 240$i$.

Further, the processing circuit 106$i$ of the parallel processor 1 of the present invention is extremely simple compared with the processor element 8 shown as the related art. That is, the portions of the processor elements 8 corresponding to the input selector (ms) 204$i$, the input selector (as) 210$i$, the input selector (bs) 216$i$, and the input selector (cs) 222$i$ are comprised of 8-input 1-output selectors, while in the parallel processor 1 of the present invention, they are comprised of the 4-input 1-output selector circuits 206$i$, 212, 218, and 224. Accordingly, according to the parallel processor of the present invention, it is possible to greatly cut the circuit size and possible to provide a high performance, inexpensive parallel processor.

This simplification of data input circuit to the full adder 240$i$ is made possible by placing the selector circuits 200$i$ and 202$i$ in front of the input selector (ms) 204$i$, the input selector (as) 210$i$, the input selector (bns) 216$i$, and the input selector (cs) 222$i$ and selecting the data from the unitary processing circuits 10$i$−1 and 10$i$+1 adjoining the unitary processing circuit 10$i$ by the selector circuits 200$i$ and 202$i$ and guiding them to the internal circuits of the processing circuit 106$i$.

Further, the processing circuit 106$i$ selects the data from the adjoining unitary processing circuits 10$i$−1 and 10$i$+1 and the data from the memory circuit 104$i$ by the selector circuits 200$i$ and 202$i$. By this selection, no restriction arises on the value of the data supplied to the terminal A and terminal B of the full adder 240$i$ in the above processing.

In addition to what is shown in the above embodiments, the parallel processor of the present invention may take various forms as explained above, for example, as modifications.

Figure 5:
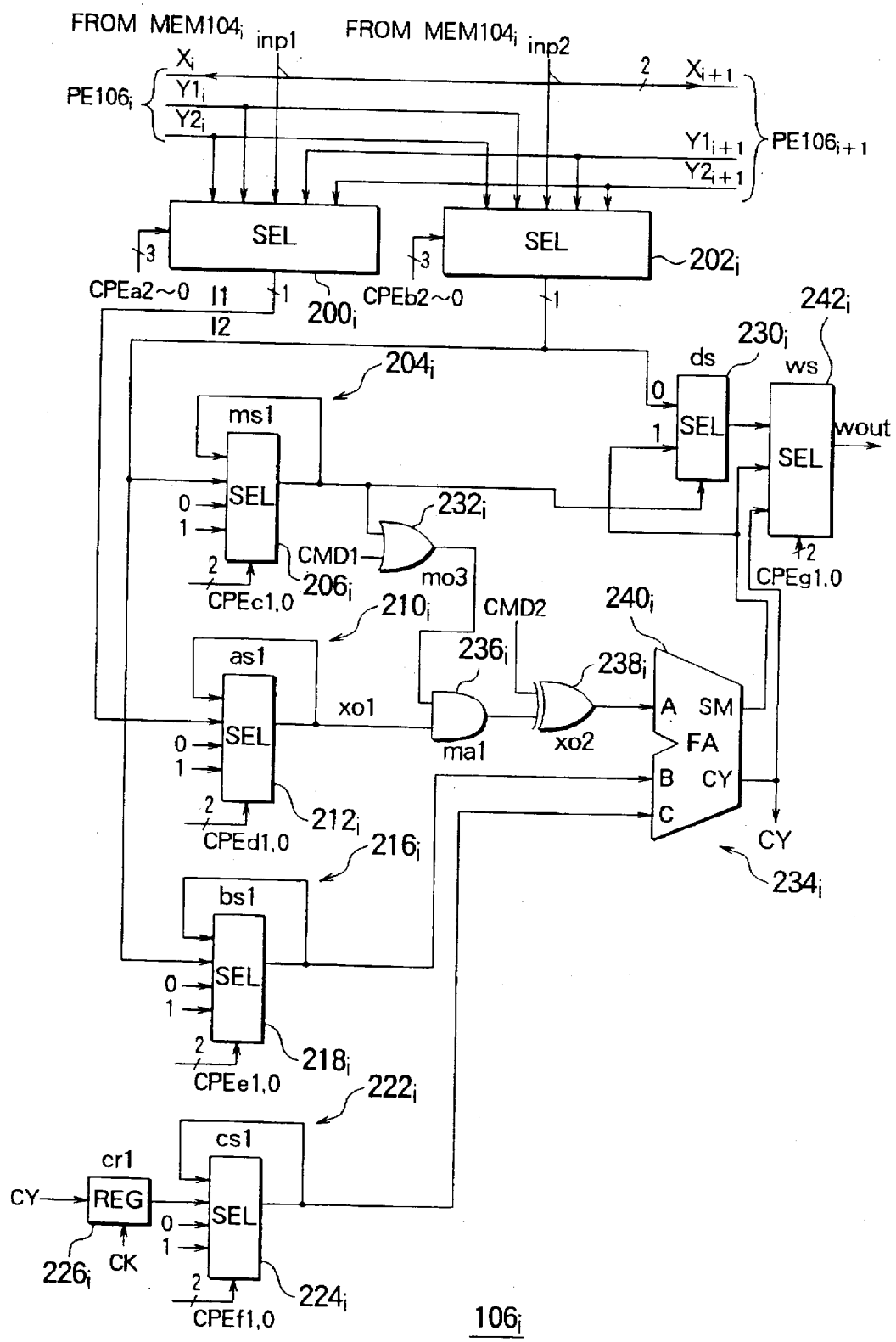
FIG. 5 is a view of another configuration of the processing circuit shown in FIG. 2 and FIG. 3.

FIG. 5 illustrates more specifically an example of a modification of the processor element 106$i$ of the present invention. The configuration of FIG. 5 is one in the case where the signals from the output terminals inp1 and inp2 of the memories 104$i$ are supplied already latched by the sense amplifiers inside the memories 104$i$. Accordingly, in the configuration of FIG. 5, the registers inside the selector 204$i$, the selector 210$i$, and the selector 216$i$ and the register 228$i$ are omitted, the output signal of the selector 202$i$ is directly connected to the selector 206$i$, selector 218$i$, and selector 230$i$, or the output signal of the selector 230$i$ is directly connected to the selector 242, but otherwise is exactly the same in configuration as the configuration of FIG. 4.

The configuration of FIG. 5 omits the four registers discussed earlier, but the same register function as these can be expected from the sense amplifiers inside the memories 104$i$, so it is clear that functions similar to those of FIG. 3 are realized.

As explained above, according to the parallel processor of the present invention, it is possible to reduce the circuit size of the selector and register supplying data to the ALU of the processor elements in the unitary processors and it is possible to reduce the redundancy of the circuit configuration and slash the power consumption.

Further, despite being able to reduce the circuit size of the processor elements, the performance is not reduced.

Further, it is possible to provide a higher performance parallel processor which can reduce the circuit size of the unitary processors and increase the number of unitary processors on a single device.

Further, it is possible to provide an inexpensive parallel processor which realizes the same number of unitary processors by a smaller device area.

Further, as a result, it is possible to further improve the performance by adding hardware etc. corresponding to the Booth multiplication algorithm instead of the circuit which was eliminated.

What is claim is:

1. A parallel processor for processing of an input signal comprised of a plurality of pieces of data per period, comprising:

a plurality of unitary processing units provided in parallel in a number corresponding to the plurality of pieces of data and performing processing for each piece of data;

each of said unitary processing units being comprised so as to enable the exchange of data with two adjoining unitary processing units, each of said unitary processing units comprised of a memory circuit and a processor element connected to said memory circuit;

each of said processor elements including:

a full adder;

a logical operation circuit for performing a logical operation on two inputs connected to a first input of said full adder;

a first selector circuit for selecting one of a first data from said memory circuit in said unitary processing unit and a first data from an adjoining memory circuit in an adjoining unitary processing unit;

a second selector circuit for selecting on of a second data from said memory circuit in said unitary processing unit and a second data from another adjoining memory circuit in another adjoining unitary processing unit;

a third selector circuit for selecting one of the second data selected by the second selector circuit, the logical value 1, and the logical value 0 and outputting the same as a first input for said logical operation circuit;

a fourth selector circuit for selecting one of the first data selected by the first selector circuit, the logical value 1, and the logical value 0 and outputting the same as a second input for said logical operation circuit;

a fifth selector circuit for selecting one of the second data selected by the second selector circuit, the logical value 1, and the logical value 0 and outputting the same as a second input for said full adder;

a sixth selector circuit or selecting one of a carrier output of said full adder, the logical value 1, and the logical value 0 and outputting the same as a third input for said full adder.

2. A parallel processor as set forth in claim 1, wherein further comprising a register circuit for holding second data selected by said second selector circuit and a seventh selector circuit for selecting one of the output of the added value of said full adder and said second data held in said register circuit in accordance with the data held by said third selector circuit.

3. A parallel processor as set forth in claim 2, further comprising registers for holding said first and second data for selection by said third to sixth selector circuits.

4. A parallel processor as set forth in claim 2, further having an eighth selector circuit for selecting one of the data selected by the seventh selector circuit, the output of the added value of the full adder, and the carrier output; and wherein, the data selected by the eighth selector circuit is stored in the memory circuit of the unitary processing unit.

5. A parallel processor as set forth in claim 2, wherein said third to sixth selector circuits include register, wherein a common configuration is adopted for the registers of the third to sixth selector circuits and the register circuit holding the second data, wherein the configuration is shared.

6. A parallel processor as set forth in claim 1, wherein said logical operation circuit performs a predetermined logical operation on the data selected by said third selector circuit, the data selected by said fourth selector circuit, and a command supplied to said processor element and outputs the result as the first input of said full adder.

7. A parallel processor as set forth in claim 6, wherein said parallel processor is formed to perform operations in accordance with a Booth multiplication algorithm instead of a predetermined logical operation.

8. A parallel processor as set forth in claim 1, further comprising a seventh selector circuit for selecting one of the output of the added value of said full adder and said second data in accordance with the data held in said third selector circuit, wherein the memories further comprise sense amplifiers which provide a register function by holding said first and second data for selection by said third to seventh selector circuits.

* * * * *